Sept. 5, 1961    G. C. LYNN ET AL    2,998,613
PNEUMATIC BOAT
Filed April 3, 1959    2 Sheets-Sheet 1
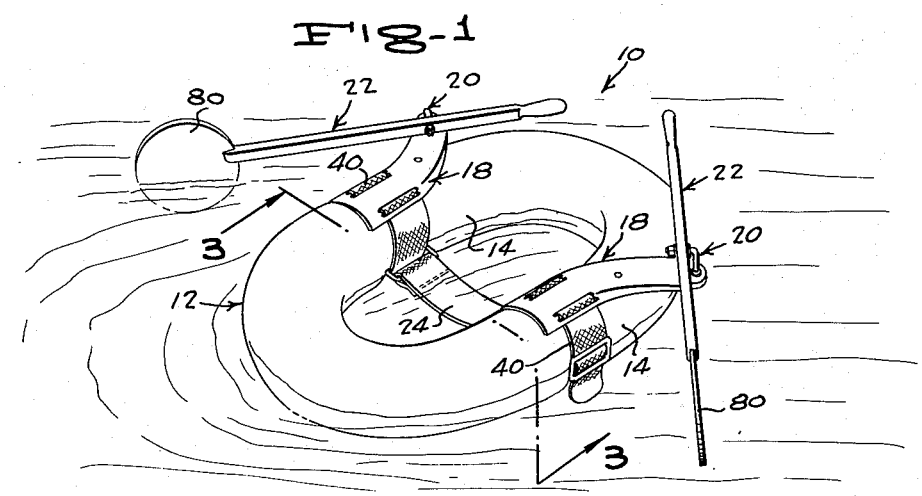
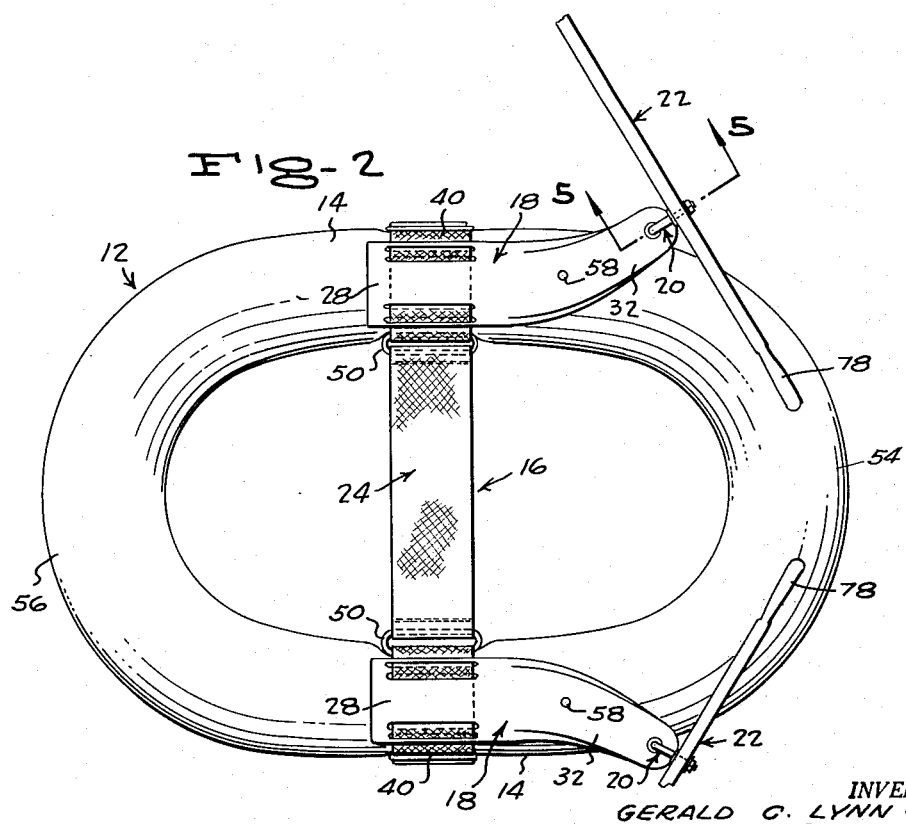
INVENTORS
GERALD C. LYNN &
THURMAN G. LYNN
BY
McMorrow, Berman & Davidson
ATTORNEYS

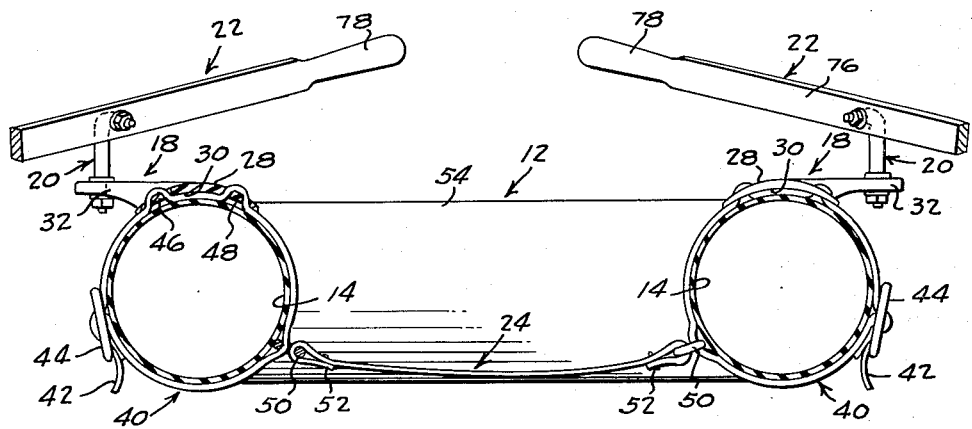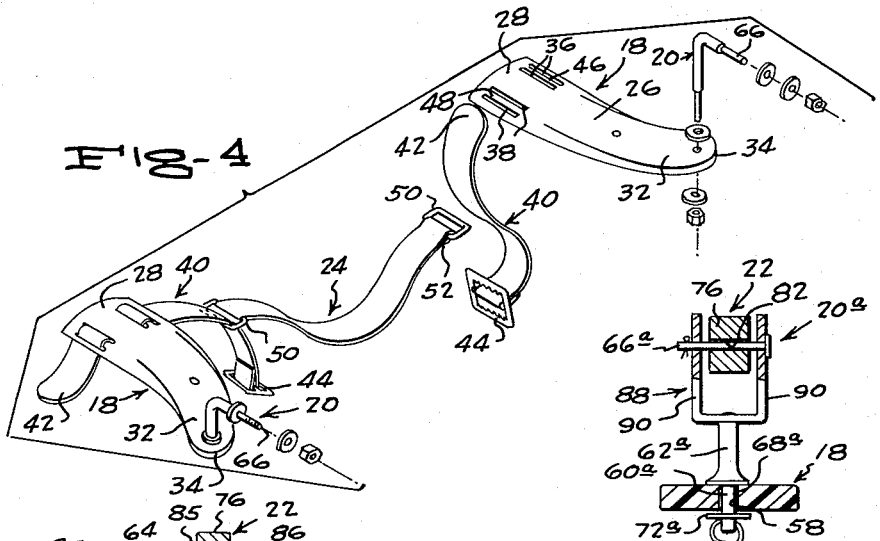

2,998,613
PNEUMATIC BOAT
Gerald C. Lynn, 560 Bear Creek Drive, Bartow, Fla., and Thurman Gerald Lynn, R.R. 5, Box 397, Evansville, Ind.
Filed Apr. 3, 1959, Ser. No. 803,976
1 Claim. (Cl. 9—347)

This invention relates to improvements in pneumatic boats, and more particularly to a novel and improved pneumatic row boat which is designed to be made from an automobile tire inner tube or from a round or oblong pneumatic float having a panel or floor extending thereacross.

The primary object of the invention is to provide an efficient, easily assembled, safe, and easily rowed boat of the character indicated, which is especially suitable for use by children at beaches and other water resorts.

Another object of the invention is to provide a unitary assembly composed of oar lock supports, oar locks, oars, and mounting means, for easy application to and removal from an inner tube or other pneumatic float, the components of the assembly being connected together for compact and easy storage and transportation, and precluding separation and loss of any component while the boat is in use in the water, the assembly being adapted to be put up in a container as a sales unit.

A further object of the invention is the provision of a simple assembly of the character indicated above, which is composed of a small number of simple and easily assembled parts, and which can be manufactured in durable and attractive forms at low cost from a variety of readily available materials.

Other important objects and advantageous features of the invention will be apparent from the following description and the accompanying drawings, wherein, for purposes of illustration only, a specific form of the invention is set forth in detail.

In the drawings:

FIGURE 1 is a perspective view of a boat of the invention;

FIGURE 2 is an enlarged top plan view of FIGURE 1;

FIGURE 3 is a further enlarged vertical transverse section taken on the line 3—3 of FIGURE 1;

FIGURE 4 is an exploded perspective view of an assembly of the invention, without its oars;

FIGURE 5 is an enlarged vertical transverse section taken on the line 5—5 of FIGURE 2; and FIGURE 6 is a view like FIGURE 5 of another form of oar lock.

Referring in detail to the drawings, wherein like numerals and related numerals designate like and related parts throughout the several views, the illustrated boat, generally designated 10, comprises a float in the form of an oval and longitudinally elongated pneumatic ring 12, which, as herein shown, is an inflated automobile tire tube, having originally a circular or annular form, and being devoid of a floor or bottom-forming web extending thereacross.

The float 12 has substantially parallel longitudinal side portions 14, to and between which is mounted an assembly 16, which comprises two oar lock supports or brackets 18, carrying oar locks 20, on which oars or paddles 22 are mounted, and a bridging strap 24 extending between the brackets 18.

The oar lock supports or brackets 18 comprise longitudinally elongated, generally horizontal rigid plates 26, which have generally rectangular rear portions 28, which are curved transversely thereof to provide, on their undersides, concavities 30 to conform to the upper surfaces of the side portions 14 of the float; and forwardly and laterally outwardly directed forward portions 32, whose free forward ends 34 reach laterally outwardly beyond the float side portions 14, as seen in FIGURE 2.

The bracket rear portions 28 have parallel pairs of parallel longitudinal slots 36 and 38 along their side edges, through which are passed cinch straps 40, having free ends 42 with buckles 44 on their other ends. As seen in FIGURES 3 and 4, the straps 40 are engaged over the longitudinal bars 46, 48 defined between the slots 36, 36 and 38, 38 and extend across the concavities 30 of the bracket plates 26. The brackets 18 are removably and securely mounted on the intermediate portions of related float side portions 14 by cinching and buckling the cinch straps 40 therearound. The straps 40 are relatively wide, so as to have wide, non-shifting bearings upon the float side portions, and so as to provide wide and non-pivotal bearings for elongated loops 50 which are engaged on the straps 40 and which are secured, as indicated at 52, on the ends of the similarly wide bridging strap 24.

The length of the bridging strap 24 is such that it draws the float side portions 14 of the inner tube 12 toward each other, so as to change the initial circular condition of the tube and produce the parallel condition of the side portions, and thereby elongate the tube, and produce the arcuate prow and stern portions 54 and 56, respectively. The resiliency of the tube 12, which produces tensioning of its side portions 14 away from each other, makes the bridging strap 24 tight or taut, so that the strap 24 is conditioned to serve as a seat for the operator of the boat 10.

As shown in FIGURE 5, the forward portions 32 of the oar lock brackets 18 have therein longitudinally spaced pivot holes 58, through which are selectively engageable, according to the reach of the operator of the boat 10, the reduced threaded pivot shanks 60 on the lower ends of the standards 62 of the L-shaped oar locks 20. The standards 62 have lateral arms 64 which are directed forwardly from the brackets 18 and terminate in reduced threaded spindles 66. At the upper ends of the pivot shanks 60 are shoulders 68 which bear upon washers 70 which bear upon the upper sides of the brackets, and washers 72 and nuts 74 are engaged on the shanks 60 against the undersides of the brackets, so as to mount the oar locks 20 swingably on the brackets 18.

The oars or paddles 22 comprise elongated bars 76 which terminate at one end in handles 78 and at their other ends in widened blades 80, and the bars 76 are provided, at suitable locations intermediate their ends, with transverse bores 82, for receiving the oar lock spindles 66, as seen in FIGURE 5, whereon the oars are removably secured by washers 84 and 85 and nuts 86 engaged on the spindle 66.

An alternate form of oar lock 20a is shown in FIGURE 6, which comprises a fork 88, whose legs 90 are traversed by a pin 66a, serving as an oar spindle, and a standard 62a depending from the fork and terminating at its lower end in a reduced shank 60a which extends through a hole 58 of the related oar lock bracket 18, with a shoulder 68a bearing upon the bracket 18. A washer 72a and a ring 74a secured on the shank 60a below the bracket 18 secure the oar lock 20a in place.

In a case where the assembly 16 is to be used with a preformed pneumatic float having a web or floor extending thereacross (not shown), the bridging strap 24 is made longer than as above described, so as to reach across between the sides of the float beneath its web.

Although there has been shown and described herein a preferred form of the invention, it is to be understood that the invention is not necessarily confined thereto, and that any change or changes in the structure of an in the relative arrangements of components thereof are contemplated as being within the scope of the invention as defined by the claim appended hereto.

What is claimed is:

A pneumatic row boat consisting of a longitudinally elongated inflated oval ring having parallel side portions, cinch straps secured around intermediate parts of said side portions, a single flexible strap extending across the opening of the ring and secured at its ends to the cinch straps, oar lock brackets mounted on the cinch straps having oar locks thereon, and oars swingably and pivotally mounted on the oar locks, said brackets comprising rigid horizontal plates extending forwardly from the cinch straps and having rear portions bearing upon the upper sides of the cinch straps, and forward portions which extend laterally outwardly beyond the cinch straps, said oar locks being mounted on said forward portions of the bracket plates, said rear portions of the bracket plates having slots therein through which the cinch straps are securably engaged.

References Cited in the file of this patent

UNITED STATES PATENTS

| | | |
|---|---|---|
| 379,153 | Cook | Mar. 6, 1888 |
| 1,869,186 | Davidson | July 26, 1932 |
| 2,156,175 | Brown | Apr. 25, 1939 |
| 2,173,963 | Eubank | Sept. 26, 1939 |
| 2,456,637 | Kearny | Dec. 21, 1948 |
| 2,815,517 | Andresen | Dec. 10, 1957 |
| 2,832,969 | Kistler | May 6, 1958 |